(12) United States Patent
Jonas et al.

(10) Patent No.: US 7,008,562 B2
(45) Date of Patent: Mar. 7, 2006

(54) METHOD OF FORMING POLYTHIOPHENE DISPERSIONS

(75) Inventors: Friedrich Jonas, Aachen (DE); Stephan Kirchmeyer, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 214 days.

(21) Appl. No.: 10/093,219

(22) Filed: Mar. 7, 2002

(65) Prior Publication Data

US 2002/0173579 A1    Nov. 21, 2002

(30) Foreign Application Priority Data

Mar. 12, 2001   (DE)   ................ 101 11 790

(51) Int. Cl.
*H01B 1/12*       (2006.01)

(52) U.S. Cl. .................................... 252/500
(58) Field of Classification Search ............... 252/500; 528/373, 377
See application file for complete search history.

(56) References Cited

U.S. PATENT DOCUMENTS

| | | | |
|---|---|---|---|
| 4,711,742 A | 12/1987 | Jen et al. ............... | 203/500 |
| 4,910,645 A | 3/1990 | Jonas et al. ............ | 340/525 |
| 5,300,575 A | 4/1994 | Jonas et al. ............ | 440/186 |
| 5,403,467 A | 4/1995 | Jonas et al. ............ | 553/125 |
| 6,084,040 A | 7/2000 | Jonas et al. ............ | 825/535 |
| 6,692,662 B1 * | 2/2004 | Haghighat et al. ...... | 252/500 |
| 6,692,663 B1 * | 2/2004 | Zhou et al. ............. | 252/500 |
| 2003/0215571 A1 * | 11/2003 | Tahon et al. ............ | 427/256 |

FOREIGN PATENT DOCUMENTS

| | | |
|---|---|---|
| DE | 196 27 071 | 1/1998 |
| EP | 0 253 594 | 1/1988 |

OTHER PUBLICATIONS

U.S. Appl. No. 60/269,606, filed Feb. 16, 2001.*

* cited by examiner

*Primary Examiner*—Mark Kopec
(74) *Attorney, Agent, or Firm*—Joseph C. Gil; James R. Franks

(57) ABSTRACT

A process for the preparation of dispersions or solutions comprising polythiophene$^+$An$^-$ ion complexes in anhydrous or low-water-content organic solvents, characterized in that at least one water-miscible organic solvent or a water-miscible solvent mixture is added to an aqueous dispersion or solution comprising optionally substituted polythiophenes, all or some of the water is removed, and the resultant dispersion or solution is, if desired, diluted with organic solvents.

8 Claims, No Drawings

METHOD OF FORMING POLYTHIOPHENE DISPERSIONS

BACKGROUND

The invention relates to the preparation and use of dispersions or solutions comprising optionally substituted polythiophenes in anhydrous or low-water-content organic solvents.

Conductive polymers based on substituted thiophenes are increasingly being used in industry, e.g., in the through-plating of circuit boards (EP-A 553671), the antistatic finishing of photographic films and plastic moldings (EP-A 440957) or for electrodes in solid-electrolyte capacitors (EP-A 340512). For uses of this type, dispersions of π-conjugated, polymeric compounds of this type are preferably employed.

Aqueous dispersions or solutions of polythiophene$^+$An$^-$ ion complexes have proven to be particularly suitable for such purposes since they have both high stability and result in coatings having excellent conductivity.

These polythiophene$^+$An$^-$ ion complexes may consist of π-conjugated polythiophenes, whose positive charges are delocalized over the entire molecule, and anions of, for example, organic polyacids, which compensate for these positive charges.

In the oxidative polymerization of substituted 3,4-alkylenedioxythiophenes using potassium peroxodisulfate as an oxidant in the presence of polystyrenesulfonic acid, EP-A 440957 states that polythiophene$^+$An$^-$ ion complexes are formed as aqueous dispersions which consist of 3,4-polyalkylenedioxythiophenes and anions of polystyrenesulfonic acid. These dispersions can be employed directly for the above-mentioned purposes.

The oxidative polymerization of substituted 3,4-alkylenedioxythiophenes which are substituted in the alkylene unit by radicals carrying acid groups likewise results in the formation of dispersions or solutions of polythiophene$^+$An$^-$ ion complexes, but in which the positive charges of the conjugated π-system are compensated by the acid anions likewise already present in the molecule.

An improved variant for the preparation of aqueous dispersions or solutions of this type is the use of ion exchangers for removing the inorganic salt content, or part thereof, originating predominantly from the chemical oxidation (DE-A 19 627 071). This desalination step prevents the formation of cloudiness and inhomogeneities (for example in the production of thin antistatic layers) and helps form highly transparent, clear layers.

However, it has been found that, in spite of the good properties of aqueous dispersions or solutions, the different wetting ability compared with water and the differentiated drying behavior of organic solvents is advantageous for some applications, e.g., for the application of conductive layers to the support material.

Simple drying or removal of the water from the above-mentioned dispersions or solutions by distillation gives powders which cannot be redispersed in a simple manner by addition of organic solvents.

EP-A 203 438 discloses polymers of substituted thiophenes which are dispersed in organic solvents. However, the disadvantage of the process described therein is the preparation of the polythiophenes from substituted 2,5-dihalothiophenes with the aid of magnesium in the presence of a nickel catalyst. It is not practicable to carry out the reaction in this way on a relatively large scale, and the content of carcinogenic and allergenic nickel prevents the use of the solution without prior, complex work-up steps.

EP-A 253 994 likewise describes a method for the preparation of solutions or dispersions of polythiophene$^+$An$^-$ ion complexes consisting of polythiophenes and anions of the conductive salts used therein, in organic solvents. In these cases, the polymerization of the monomeric thiophenes takes place through chemical oxidation in the organic solvent itself. In this process, however, the desired product precipitates out of the reaction solution and therefore cannot be used, for example, for the production of transparent films.

According to EP-A 440 957, dispersions comprising 3,4-polyalkylenedioxythiophenes can be prepared directly in organic solvents, but the inorganic salt content, predominantly originating from the chemical oxidation, remains in solution in such cases, which may lead to the above-mentioned undesired effects in the production of coatings.

There was therefore a need to find a method of combining the excellent conductivity and coating properties of the fully or partially desalinated, aqueous dispersions or solutions of the polythiophene$^+$An$^-$ ion complexes with the widely variable wetting and drying properties of organic solvents.

SUMMARY

The invention relates to a process for preparing a dispersion or a solution containing an optionally substituted polythiophene in an organic solvent, comprising a) adding a water-miscible organic solvent or a water-miscible solvent mixture to an aqueous dispersion or solution comprising optionally substituted polythiophenes, and b) removing at least some of the water from the mixture resulting from step a).

In one embodiment, the invention relates to a process for preparing a dispersion or a solution containing polythiophene$^+$An$^-$ ion complexes in organic solvents, comprising a) adding a water-miscible organic solvent or a water-miscible organic solvent mixture to an aqueous dispersion or solution of polythiophene$^+$An$^-$ ion complexes, wherein polythiophene$^+$ is a polymer which comprises recurring units of the formula (I)

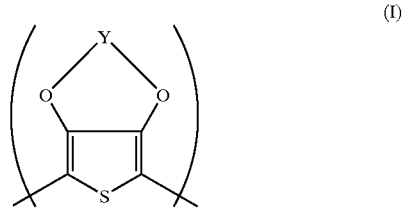

at least some of which are positively charged and wherein

Y is —(CH$_2$)$_m$—CR$^1$R$^2$(CH$_2$)$_n$— or an optionally substituted 1,2-C$_3$–C$_8$-cycloalkylene radical, and R$^1$ and R$^2$, independently of one another, are hydrogen, hydroxymethyl, an optionally substituted C$_1$–C$_{20}$-alkyl radical or an optionally substituted C$_6$–C$_{14}$-aryl radical, and m and n are identical or different and are an integer from 0 to 3, and wherein An$^-$ is an anion of an organic polyacid, or wherein polythiophene⁺An⁻ is a polymer which comprises recurring units of the formula (II)

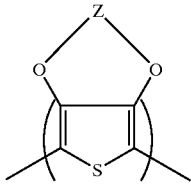

(II)

in which at least some of the thiophene rings carry a positive charge and wherein
Z is —(CH₂)$_m$—CR³R⁴(CH₂)$_n$—,
R³ is hydrogen or —(CH₂)$_s$—O—(CH₂)$_p$—SO₃⁻M⁺,
R⁴ is —(CH₂)$_s$—O—(CH₂)$_p$—SO₃⁻M⁺,
m and n are an integer from 0 to 3,
M⁺ is a cation,
s is an integer from 0 to 10, and
p is an integer from 1 to 18,
and b) removing water from the mixture resulting in step a).

These and other features, aspects, and advantages of the present invention will become better understood with reference to the following description and appended claims.

DESCRIPTION

A process has now been found for the preparation of dispersions or solutions comprising optionally substituted polythiophenes in organic solvents, which is characterized in that
1) a water-miscible organic solvent or a water-miscible solvent mixture is added to an aqueous dispersion or solution comprising optionally substituted polythiophenes, and
2) at least some of the water is removed from the resultant mixtures, and
3) the mixtures are, if desired, diluted with organic solvents.

For step 1), preference is given to dispersions or solutions comprising polythiophene⁺An⁻ ion complexes, where polythiophene⁺ is a polymer which comprises recurring units of the formula (I)

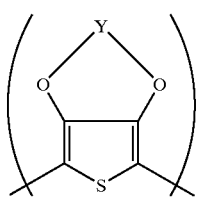

(I)

at least some of which are positively charged and in which
Y is —(CH₂)$_m$—CR¹R²(CH₂)$_n$— or an optionally substituted 1,2-C₃–C₈-cycloalkylene radical, and
R¹ and R², independently of one another, are hydrogen, hydroxymethyl, an optionally substituted C₁–C₂₀-alkyl radical or an optionally substituted C₆–C₁₄-aryl radical, and m and n are identical or different and are an integer from 0 to 3, and where
An⁻ is an anion of an organic polyacid, or where polythiophene⁺An⁻ is a polymer which comprises recurring units of the formula (II)

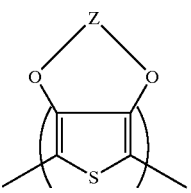

(II)

in which at least some of the thiophene rings carry a positive charge and in which
Z is —(CH₂)$_m$—CR³R⁴(CH₂)$_n$—,
R³ is hydrogen or —(CH₂)$_s$—O—(CH₂)$_p$—SO₃⁻M⁺,
R⁴ is —(CH₂)$_s$—O—(CH₂)$_p$—SO₃⁻M⁺,
M⁺ is a cation,
s is an integer from 0 to 10, and
p is an integer from 1 to 18.

The polythiophenes of the formulae (I) and (II) are in polycationic form. The positive charges are delocalized over the entire molecule and are therefore not shown in the formulae.

M⁺ in the formula (II) may be not only, for example, a metal ion, proton or optionally substituted ammonium ion, but is preferably also, for example, a cationic unit of the polythiophene. Preference is likewise given to alkali metal ions and ammonium ions as well as protons.

For step 1), particular preference is given to dispersions or solutions of polythiophene⁺An⁻ ion complexes where polythiophene⁺ is a polymer which comprises recurring units of the formula (I), at least some of which are positively charged and in which
Y is —(CH₂)$_m$—CR¹R²(CH₂)$_n$— or a 1,2-cyclohexylene radical, R¹ and R², independently of one another, are hydrogen, hydroxymethyl, C₁–C₈-alkyl or phenyl, m and n are identical or different and are 0 or 1, and where
An⁻ is an anion of a polyacrylic acid, polysulfonic acid, polystyrenesulfonic acid, a mixture thereof or a copolymer of the parent monomers or copolymers with acid-free monomers, or where polythiophene⁺An⁻ is a polymer which comprises recurring units of the formula (II), in which at least some of the thiophene rings carry a positive charge and in which
Z is —(CH₂)$_m$—CR¹R²(CH₂)$_n$—,
R³ is hydrogen,
R⁴ is —(CH₂)$_s$—O—(CH₂)$_p$—SO₃⁻M⁺,
m and n are identical or different and are an integer from 0 to 3,
M⁺ is a cation,
s is 0, 1 or 2,
p is 4 or 5.

Very particular preference is given to dispersions or solutions of polythiophene⁺An⁻ ion complexes where polythiophene⁺ is a polymer which comprises recurring units of the formula (I), at least some of which are positively charged and in which
Y is a 1,2-ethylene radical, and where
An⁻ is an anion of a polystyrenesulfonic acid, or where polythiophene⁺An⁻ is a polymer which comprises recurring units of the formula (II), in which at least some of the thiophene rings carry a positive charge and in which Z is —$(CH_2)_m$—$CR^3R^4(CH_2)_n$—,
$R^3$ is hydrogen,
$R^4$ is —$(CH_2)_s$—O—$(CH_2)_p$—$SO_3^-M^+$,
m is 0 or 1,
n is 0 or 1,
$M^+$ is a cation,
s is 0 or 1, and
p is 4.

In this first step, the amount of the water-miscible solvent or water-miscible organic solvent mixture added is, for example, from about 5 to about 1000% by weight, based on the aqueous ion complex dispersions or solutions that are employed. Suitable solvents here include but are not limited to: amidic solvents, such as formamide, N-methylacetamide, N,N-dimethylacetamide, N-methylpyrrolidone, N-methylcaprolactam and N-methylformamide. Alcohols and ethers, such as ethylene glycol, glycerol, ethylene glycol dimethyl ether, ethylene glycol monomethyl ether, ethylene glycol monobutyl ether or dioxane. Water-soluble solvent mixtures consisting of solvents which are water-miscible per se and solvents which are not water-miscible per se are likewise included.

The solvents may be added individually or in the form of a mixture or in the form of a mixture together with sugar alcohols, such as sorbitol or mannitol.

Preference is given to amidic solvents and solvents which have a boiling point of above about 100° C. at atmospheric pressure and water-miscible solvents or water-miscible solvent mixtures which form an azeotrope with water.

Step 2) can be carried out, for example, by membrane process, such as ultrafiltration, or by distillation. Distillation is preferred here and can be carried out, for example, at a temperature of from about 0 to about 200° C., preferably from about 20 to about 100° C. The pressure selected for the distillation can be atmospheric pressure or reduced pressure. Reduced pressure down to about 0.001 mbar is preferred here.

Step 3) can be carried out if desired. The solvents employed for the dilution may be the solvents or solvent mixtures described in step 1). In addition, the following solvents, for example, are suitable: aliphatic alcohols, such as methanol, ethanol, n-propanol, isopropanol, n-butanol, isobutanol, tert-butanol, amyl alcohol, isoamyl alcohol and neopentyl alcohol, aliphatic ketones, such as acetone, methyl ethyl ketone, methyl isobutyl ketone and methyl tert-butyl ketone, ethers, such as tetrahydrofuran and methyl tert-butyl ether, esters of aliphatic and aromatic carboxylic acids, such as ethyl acetate, butyl acetate, glycol monomethyl ether acetate and butyl phthalate, aliphatic and aromatic hydrocarbons, such as pentane, hexane, cyclohexane, octane, isooctane, decane, toluene, o-xylene, m-xylene and p-xylene.

For the dilution, the solvent can be employed alone or in the form of a mixture.

In accordance with the invention, ion complex dispersions are obtained which have a water content of from 0 to about 20% by weight, preferably from 0 to about 5% by weight.

The content of the ion complexes in the dispersions can be from about 0.01 to about 20% by weight, preferably from about 0.2 to about 5% by weight.

The ion complex dispersions prepared in accordance with the invention can be used, for example, for the production of rechargeable batteries, light-emitting diodes, sensors, electrochromic windows, coatings of copier drums, cathode ray tubes, electrically conductive and antistatic coatings on plastic films, plastic moldings or on photographic materials.

In one embodiment, the invention is a dispersion or a solution having an inorganic salt that is less than about 40% of the amount originally employed for the preparation of the polythiophene⁺An⁻ by oxidative polymerization. In one embodiment the polythiophene⁺ can be prepared in accordance to the procedures described in EP-A 440957.

In one embodiment, the invention is a process for providing a substrate with conductivity comprising applying a dispersion or a solution, made in accordance to the invention, to a substrate. In another embodiment, the invention is a process for the antistatic finishing of substrates comprising applying to a substrate a dispersion or a solution comprising a polythiophene⁺An⁻ ion complex made in accordance to the invention. In another embodiment, the invention is a process for the antistatic finishing of photographic material comprising applying to a photographic material a dispersion or a solution made in accordance to the invention.

The dispersions or solutions according to the invention can furthermore be used for data storage, optical signal conversion, suppression of electromagnetic interference (EMI) and conversion of solar energy.

In addition, they can be used, for example, for the production of solid electrolytes in solid-state capacitors, of electroluminescent displays and of transparent electrodes, e.g., in touch screens.

Coatings can be produced, for example, by known process, such as, spraying, gravure printing, offset printing, curtain coating, spin coating, roller coating, brushing and dipping.

If desired, it is furthermore possible to add binders and/or crosslinking agents, such as, for example, polyurethanes or dispersions thereof, polyacrylates, polyolefin dispersions and epoxysilanes, such as 3-glycidoxypropyltrialkoxysilanes, to the dispersions prepared in accordance with the invention.

In order to increase the scratch resistance of coatings, it is furthermore possible to add silane hydrolysates, such as those based on tetraethoxysilane, to the dispersions according to the invention (see, inter alia, EP-A 825 219).

The invention is further described in the following illustrative examples in which all parts and percentages are by weight unless otherwise indicated.

EXAMPLES

Example 1

Preparation of an Aqueous Suspension of a Polythiophene⁺An⁻ Ion Complex 20 g of free polystyrenesulfonic acid (Mn about 40,000), 21.4 g of potassium peroxodisulfate and 50 mg of iron(III) sulfate were introduced with stirring into 2000 ml of water. 8.0 g of 3,4-ethylenedioxythiophene were added with stirring. The solution was stirred at room temperature for 24 hours. 100 g of anion exchanger (Lewatit MP 62, commercial product from Bayer AG) and 100 g of cation exchanger (Lewatit S 100, commercial product from Bayer AG), both water-moist, were subsequently added, and the mixture was stirred for 8 hours.

The ion exchangers were removed by filtration. A ready-to-use solution having a solids content of about 1.2% by weight was obtained.

Example 2

100 g of the solution prepared in accordance with Example 1 were introduced into a 500 ml three-necked flask fitted with stirrer and internal thermometer. 200 g of dimethylacetamide were added over the course of 15 minutes with stirring, and 122 g of a mixture of water and dimethylacetamide were subsequently distilled off at 40° C. and a pressure of 18 mbar.

The solution had a water content of 3.9% (determined by the Karl Fischer method) and a solids content of 0.8% (determined by drying at 140° C. for 12 hours).

In order to produce coatings, in each case 10 g of the solution were diluted with the amounts of ethanol indicated in the table. The solutions were subsequently applied to polyester films in a wet-film thickness of 24 μm using a spiral doctor blade and dried at 60° C. for 15 minutes, and the surface resistance values were determined. The values measured are shown in Table 1. In all cases, conductive, transparent, clear coatings were obtained.

TABLE 1

| Experiment No. | Ethanol [g] | Surface resistance [Ω/ ] |
| --- | --- | --- |
| 1 | 5 | 4200 |
| 2 | 10 | 68 * 10³ |
| 3 | 50 | 895 * 10³ |
| 4 | 100 | 3.6 * 10⁷ |

Example 3

70 g of the solution prepared in accordance with Example 1 were introduced into a 500 ml three-necked flask fitted with stirrer and internal thermometer. 130 g of N-methylpyrrolidone were added over the course of 10 minutes with stirring, and 67 g of a mixture of water and N-methylpyrrolidone were subsequently distilled off at 20° C. and a pressure of 8 mbar.

In order to produce coatings, the solution was applied to polyester films in a wet-film thickness of 24 μm using a spiral doctor blade and dried at 40 or 100° C. for 12 hours, and the surface resistance values were determined. The values measured are shown in Table 2. In both cases, conductive, transparent, clear coatings were obtained.

TABLE 2

| Experiment No. | Drying temperature [° C.] | Surface resistance [Ω/ ] |
| --- | --- | --- |
| 1 | 40 | 1.8 * 10³ |
| 2 | 100 | 7.8 * 10³ |

Although the present invention has been described in detail with reference to certain preferred versions thereof, other variations are possible. Therefore, the spirit and scope of the appended claims should not be limited to the description of the versions contained therein.

What is claimed is:

1. A process for preparing a dispersion or a solution containing a polythiophene⁺An⁻ ion complex in an organic solvent, the process comprising the consecutive steps of:
   a) adding a water-miscible organic solvent or a water-miscible organic solvent mixture to an aqueous dispersion or a solution of a polythiophene⁺An⁻ ion complex, wherein the polythiophene⁺ is a polymer comprising recurring units represented by formula (I)

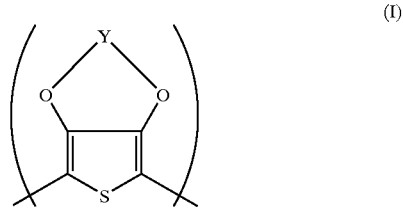

(I)

at least some of which are positively charged and wherein

Y is —$(CH_2)_m$—$CR^1R^2(CH_2)_n$— or an optionally substituted 1,2-$C_3$-$C_8$-cycloalkylene radical, and $R^1$ and $R^2$, independently of one another, are hydrogen, hydroxymethyl, an optionally substituted $C_1$-$C_{20}$-alkyl radical or an optionally substituted $C_6$-$C_{14}$-aryl radical, and m and n are identical or different and are an integer from 0 to 3, and wherein An⁻ is an anion of an organic polyacid, or wherein the polythiophene⁺An⁻ is a polymer comprising recurring units represented by formula (II)

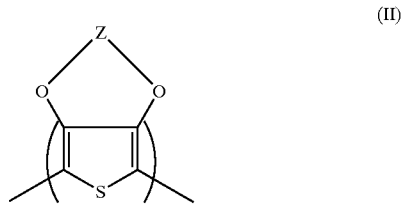

(II)

wherein at least some of the thiophene rings carry a positive charge and wherein Z is —$(CH_2)_m$—$CR^3R^4(CH_2)_n$—, $R^3$ is hydrogen or —$(CH_2)_s$—O—$(CH_2)_p$—$SO_3^-M^+$, $R^4$ is —$(CH_2)_s$—O—$(CH_2)_p$—$SO_3^-M^+$, m and n are an integer from 0 to 3, $M^+$ is a cation, s is an integer from 0 to 10, and p is an integer from 1 to 18;

and b) removing water from the mixture resulting in step a), thereby forming the dispersion or the solution, wherein in step (b) water is removed from the mixture by means of a membrane process.

2. The process according to claim 1, wherein the process further comprises diluting the dispersion or the solution resulting from the process with an organic solvent or a mixture of organic solvents subsequent to step b).

3. The process according to claim 1, wherein the polythiophene⁺ is a polymer comprising recurring units represented by formula (I):

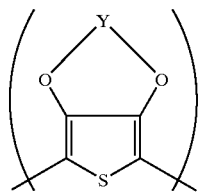
(I)

at least some of which are positively charged and wherein
Y is —$(CH_2)_m$—$CR^1R^2(CH_2)_n$— or an optionally substituted 1,2—$C_3$–$C_8$-cyclohexylene radical, and
$R^1$ and $R^2$, independently of one another, are hydrogen, hydroxymethyl, an optionally substituted $C_1$–$C_{20}$-alkyl radical or an optionally substituted $C_6$–$C_{14}$-aryl radical, and
m and n are identical or different and are integer from 0 to 3, and wherein
An⁻ is an anion of an organic polyacid, at least some of which are positively charged and wherein
Y is —$(CH_2)_m$—$CR^1R^2(CH_2)_n$— or a 1,2-cyclohexylene radical, and
$R_1$ and $R^2$, independently of one another, are hydrogen, hydroxymethyl, $C_1$–$C_8$-alkyl or phenyl, and m and n are identical or different and are 0 or 1, and
An⁻ is an anion of a polyacrylic acid, polyvinylsulfonic acid, polystyrenesulfonic acid, a mixture thereof or a copolymer of the parent monomers or copolymers with acid-free monomers.

4. The process according to claim 1, wherein the polythiophene⁺ An⁻ is a polymer comprising recurring units of the formula (II),
wherein at least some of the thiophene rings carry a positive charge and further wherein
Z is —$(CH_2)_m$—$CR^1R^2(CH_2)_n$—,
$R^3$ is hydrogen,
$R^4$ is —$(CH_2)_s$—O—$(CH_2)_p$—$SO_3^-M^+$,
m and n are an integer from 0 to 3,
$M^+$ is a cation,
s is 0, 1 or 2, and
p is 4 or 5.

5. The process according to claim 1, wherein the polythiophene⁺ is a polymer comprising recurring units of the formula (I), at least some of which are positively charged and
wherein
Y is a 1,2-ethylene radical, and
An⁻ is an anion of a polystyrenesulfonic acid.

6. The process according to claim 1, wherein the polythiophene⁺An⁻ is a polymer comprising recurring units represented by formula (II),

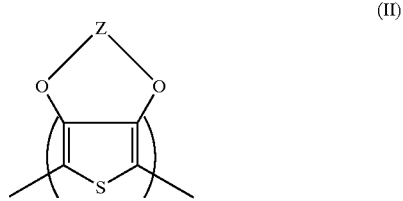
(II)

wherein at least some of the thiophene rings carry a positive charge and wherein
Z is —$(CH_2)_m$—$CR^3R^4(CH_2)_n$—,
$R^3$ is hydrogen,
$R^4$ is —$(CH_2)_s$—O—$(CH_2)_p$—$SO_3^-M^+$,
m is 1,
n is 0 or 1,
$M^+$ is a cation,
s is 0 or 1, and
p is 4.

7. The process according to claim 1, wherein an aqueous dispersion or the solution of the polythiophene⁺An⁻ ion complex which has been fully or partially freed from the inorganic salt content is used as a starting material.

8. The process of claim 1 wherein said membrane process of step (b) is an ultrafiltration process.

* * * * *